United States Patent
Horak et al.

[19]

[11] Patent Number: 5,964,662
[45] Date of Patent: Oct. 12, 1999

[54] THRUST COUPLER

[75] Inventors: James M. Horak, Stillwater; Brian D. Simpson, Yale, both of Okla.

[73] Assignee: Brunswick Corporation, Lake Forest, Ill.

[21] Appl. No.: 08/988,803

[22] Filed: Dec. 11, 1997

[51] Int. Cl.[6] .................................................. F16D 3/56
[52] U.S. Cl. ............................................. 464/93; 464/57
[58] Field of Search ............................ 464/57, 88, 92, 464/93, 87, 160, 147, 182

[56] References Cited

U.S. PATENT DOCUMENTS

| | | | |
|---|---|---|---|
| 1,034,249 | 7/1912 | Kennington | 464/57 |
| 2,907,189 | 10/1959 | Flieg | 464/160 |
| 2,936,625 | 5/1960 | Heiseler | 464/57 |
| 3,731,499 | 5/1973 | Morlon | 464/93 |
| 3,793,849 | 2/1974 | Downey | 464/93 |
| 3,798,924 | 3/1974 | Downey | 464/93 |
| 4,121,532 | 10/1978 | Coryell, III | 464/182 |
| 5,123,311 | 6/1992 | Dymek | 464/57 |

FOREIGN PATENT DOCUMENTS

| | | | |
|---|---|---|---|
| 1273927 | 9/1961 | France | 464/92 |
| 693844 | 7/1953 | United Kingdom | 464/57 |

OTHER PUBLICATIONS

"Mechanisms & Mechanical Devices Source Book" published in 1991 by McGraw-Hill, Inc. and written by Nicholas P. Chironis; Chapter 7 is titled "Coupling, Clutching and Braking Devices".

MerCruiser Gasoline Engines Ski Models manual (90–860178970).

*Primary Examiner*—Eileen Dunn Lillis
*Attorney, Agent, or Firm*—William D. Lanyi

[57] ABSTRACT

A coupling device is provided with two flanges and a resilient annular member disposed between facing surfaces of the flanges. The resilient annular member is provided with a central opening through which a metallic spring is disposed to exert a resistive force against compression of the resilient annular member between the two flanges. The device is particularly well suited for use in a marine propulsion system because of the propulsive force exerted on the shaft system by the propeller. In one particularly preferred arrangement, each of the two flanges is provided with three holes, and the resilient annular member is provided with six holes. The two flanges are offset rotationally to place each of the holes of one flange in alignment with an interstitial space between the holes of the other flange.

19 Claims, 7 Drawing Sheets

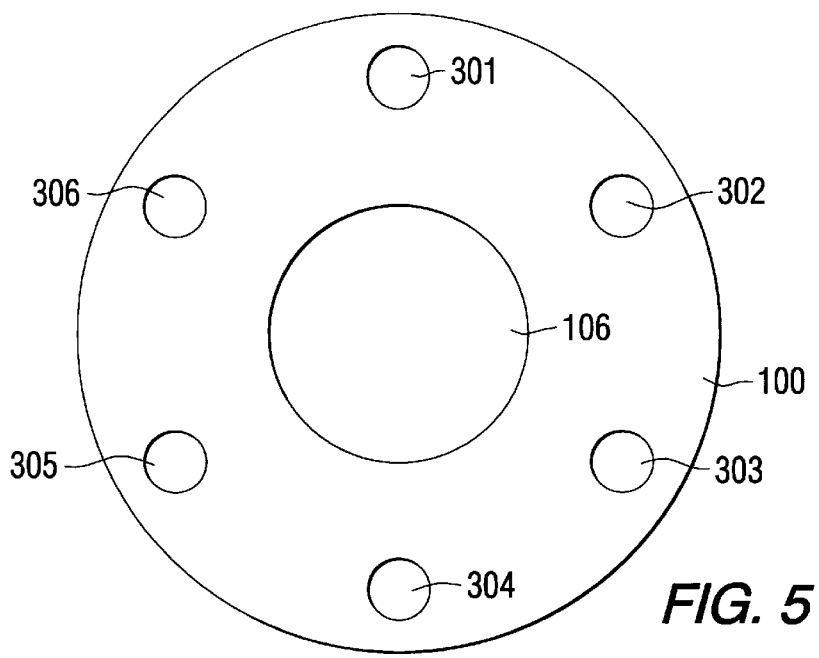
*FIG. 5*
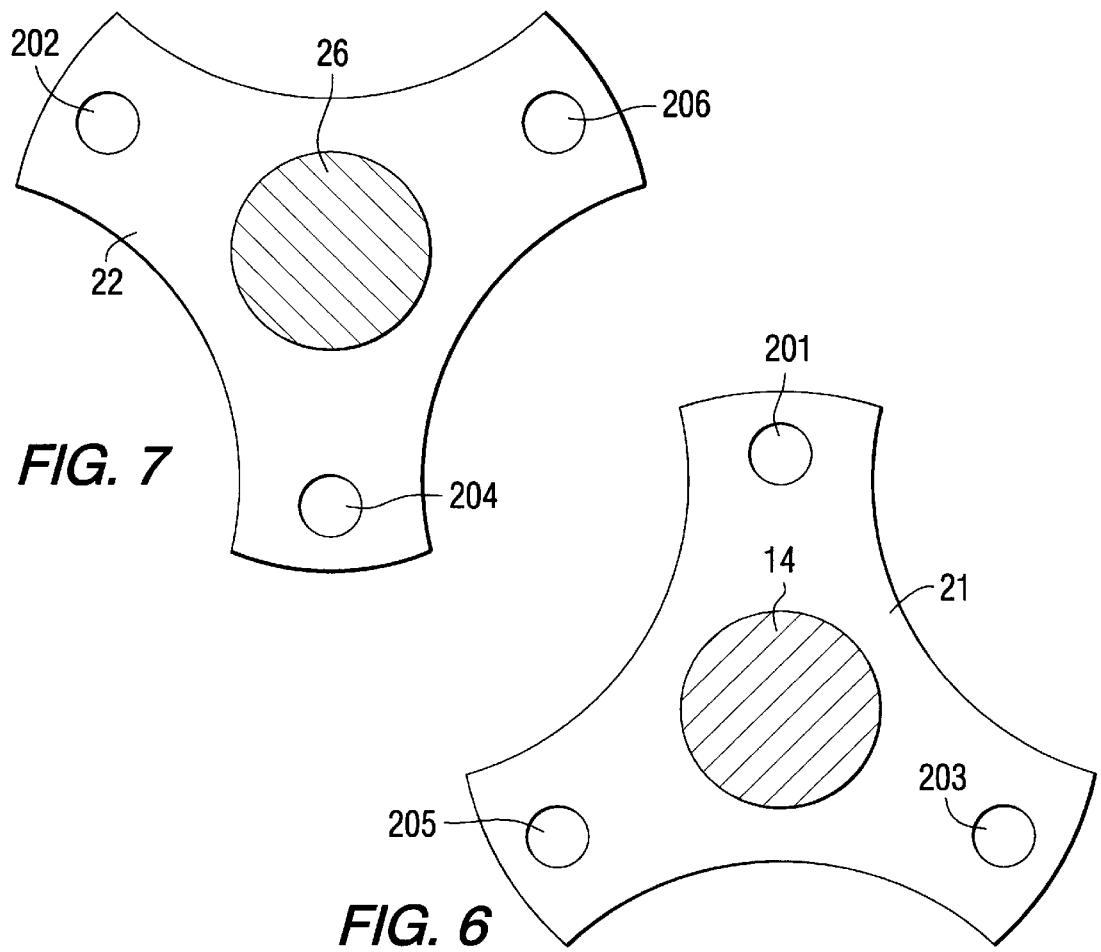
*FIG. 7*
*FIG. 6*

THRUST COUPLER

BACKGROUND OF THE INVENTION

1. Field of the Invention

The present invention generally relates to a thrust coupler and, more particularly, to a thrust coupler with a resilient insert that is able to withstand compressive forces.

2. Description of the Prior Art

Many different types of coupling devices are known to those skilled in the art. Typically, the coupling device is connected between two rotatable shafts in a manner that enables the system to transmit torque from a drive shaft to another shaft. In some applications, the two shafts are not coaxial and in some applications the two shafts do not necessarily rotate at precisely the same instantaneous angular velocities at all times. The primary function of any coupling device, such as the one that will be described below in the description of the preferred embodiment of the present invention, is to allow two rotatable shafts to be connected together, typically with flanges, in a manner that transits torque between them. One particular application of this type of coupling device is in a marine propulsion system such as an inboard drive system.

Some coupling devices bolt the metallic flanges of the two shafts directly together. Others place a resilient member between the flanges in order to absorb the forces caused by misalignments of the two shafts and flanges.

A book titled, "Mechanisms & Mechanical Devices Source Book" by Nicholas P. Chironis, was published in 1991 by McGraw-Hill, Inc. Chapter 7, which is titled "Coupling, Clutching and Braking Devices", deals with many types of coupling devices. Chapter 7 provides a summary of these coupling devices along with brief descriptions relating to their structure and theory of operation.

Several companies that manufacture marine propulsion devices describe the alignment procedure in their installation manuals. For example, one such manual is the 1996 installation manual for MerCruiser gasoline ski boat models which incorporate inboard marine propulsion systems.

When used in the marine industry, a typical application of a coupling device incorporates two metallic flanges bolted directly together to connect a propeller shaft to the output shaft of a transmission driven by an internal combustion engine. Typically, the propeller shaft extends through the hull of the boat and has a propeller attached to a distal end thereof. The engine and transmission must be moved and adjusted so that their position causes the output shaft to be aligned coaxially with the propeller shaft which typically has much less freedom of movement relative to the boat hull. If the two shafts are not aligned properly, the propulsion system can exhibit noise and may eventually experience significant damage. The present technique for aligning the two shafts in a marine propulsion system, such as an inboard propulsion system, is to alter various adjustable support brackets to change the position of the internal combustion engine and transmission until the output shaft is coaxial with the propeller shaft. When this occurs, a flange attached to an end of the output shaft is fastened to a flange attached to the end of the propeller shaft.

The procedure described immediately above can be very time consuming and expensive to perform. If it is not properly performed at prescribed intervals of boat usage, damage can occur. It would therefore be significantly beneficial if a coupling device could be developed which is suitable for use in a marine propulsion system, but which does not require the precise alignment accuracy normally required in known marine propulsion systems.

SUMMARY OF THE INVENTION

The present invention provides a coupler device comprising a first flange attached to a first shaft and second flange attached to a second shaft. The first and second shafts are generally aligned in coaxial relation with each other.

A resilient annular member is disposed between the first and second flanges. A metal spring is disposed between the first and second flanges, and the two flanges are fastened together in order to compress the resilient annular member and the metal spring between them.

In a preferred embodiment of the present invention, the first shaft is an output shaft of an internal combustion engine and transmission assembly, and the second shaft is attached to a propeller. Naturally, the system can further comprise a boat, and the second shaft can extend through a hull of the boat. The first flange, in certain embodiments of the present invention, can be generally triangular in shape with a first set of three holes formed therethrough. A second flange is also generally triangular in shape with a second set of three holes formed therethrough. The resilient annular member, which is disposed between the first and second flanges, has six holes formed through its thickness. The first set of three holes of the first flange are aligned and associated with a preselected three of the six holes of the annular member. This attaches the first flange to the resilient annular member. The second set of three holes of the second flange are aligned and associated with the remaining three of the six holes of the annular member to attach a second flange to the resilient annular member. The resilient annular member can be non-metallic and, in a preferred embodiment of the present invention, is made of an elastic material such as rubber or plastic. The metallic spring is disposed through a central opening in the resilient annular member.

BRIEF DESCRIPTION OF THE DRAWINGS

The present invention will be more fully and completely understood from a reading of the description of the preferred embodiment in conjunction with the drawings, in which:

FIGS. 5, 6 and 7 are section views of the device illustrated in FIG. 4;

DESCRIPTION OF PREFERRED EMBODIMENT

Figure 1:
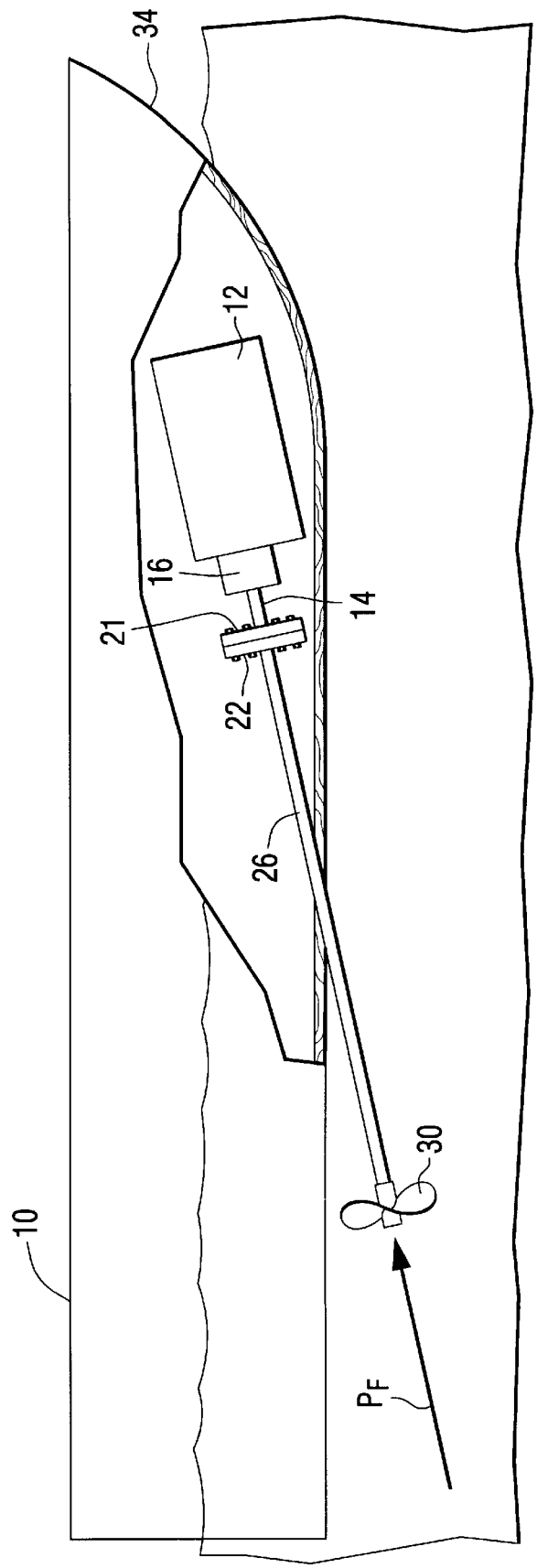
FIG. 1 shows a schematic representation of a boat with an inboard propulsion system.

Throughout the description of the preferred embodiment, like components will be identified by like reference numerals.

FIG. 1 is a highly schematic representation of a boat 10 which has an inboard marine propulsion unit. The total propulsion system comprises an engine 12 which has an output shaft 14, typically connected through a transmission 16, to a shaft coupling arrangement which incorporates a first flange 21 and a second flange 22 connected, respectively, to the output shaft 14 of the engine and a propeller shaft 26. The propeller shaft 26 extends through a seal in the hull of the boat and has a propeller 30 attached to its end.

The first and second flanges, 21 and 22, are bolted together with a plurality of bolts that rigidly attach the output shaft 14 to the propeller shaft 26. Several problems can occur with regard to an arrangement such as that shown in FIG. 1. In a marine propulsion system, slight deformation of the hull 34 of the boat 10 can cause a misalignment between the output shaft 14 and the propeller shaft 26. In other words, if these two shafts are not in good, coaxial alignment, proper operation of the marine propulsion system is jeopardized. The specific types of misalignment will be described in greater detail below, but it is well-known that periodic maintenance alignments should be performed to assure the coaxial relationship between the output shaft 14 and the propeller shaft 26. If misalignment occurs as a result of extensive use of the boat or movement of the boat into or out of the water, realignment procedures should be performed to avoid damage that could otherwise be caused by misalignment. During the realignment procedure, the engine 12 is moved relative to the hull and relative to the propeller shaft 26 by adjusting mounting brackets that hold the engine and transmission in their proper position within the hull.

With continued reference to FIG. 1, marine propulsion systems create a condition that is not common in all shaft coupling situations. When in operation, the rotating propeller 30 creates a propulsion force $P_F$ that propels the boat 10 through the water. This force is transmitted to the boat through the propeller shaft 26, the coupling, and the output shaft 14. This force $P_F$, which can be significant in certain cases, is a reason for not using certain known types of couplings that could otherwise be useful to permit modest misalignment between the output shaft 14 and the propeller shaft 26.

Figure 2:
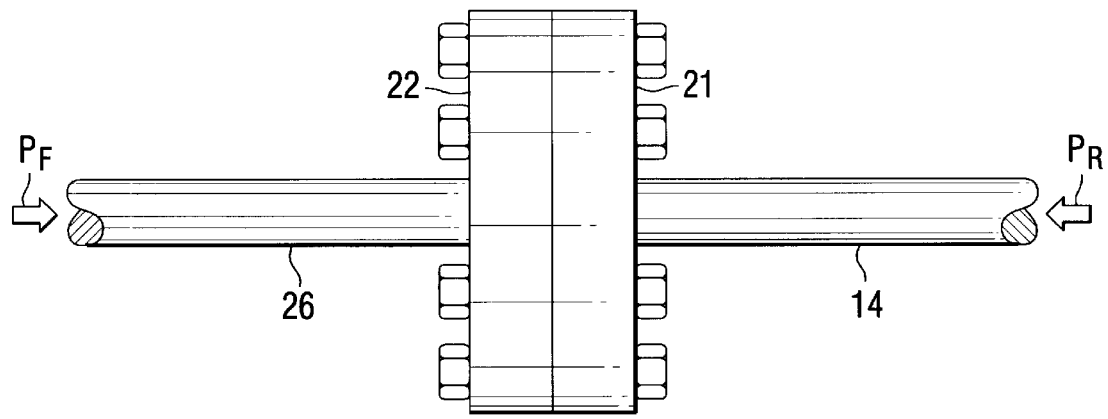
FIG. 2 is an enlarged view of a coupling between two shafts of the propulsion system shown in FIG. 1.

FIG. 2 is an enlarged view of the coupling device described above in conjunction with FIG. 1. The first and second flanges, 21 and 22, are shown attached to their respective shafts. The first flange 21 is rigidly attached to the output shaft 14, and the second flange 22 is rigidly attached to the propeller shaft 26. For purposes of illustration, a propulsive force $P_F$ is shown exerted in the direction that a propeller 30 would exert the force on the system. A reaction to that propulsive force is identified by arrow $P_R$ in FIG. 2. If the two flanges are arranged in perfect alignment as a result of the perfect coaxial relationship between the output shaft 14 and the propeller shaft 26, systems such as that shown in FIG. 2 work well. However, if the two shafts are not properly aligned in a coaxial relationship, the flanges do not align perfectly as shown in FIG. 3.

Figure 3:
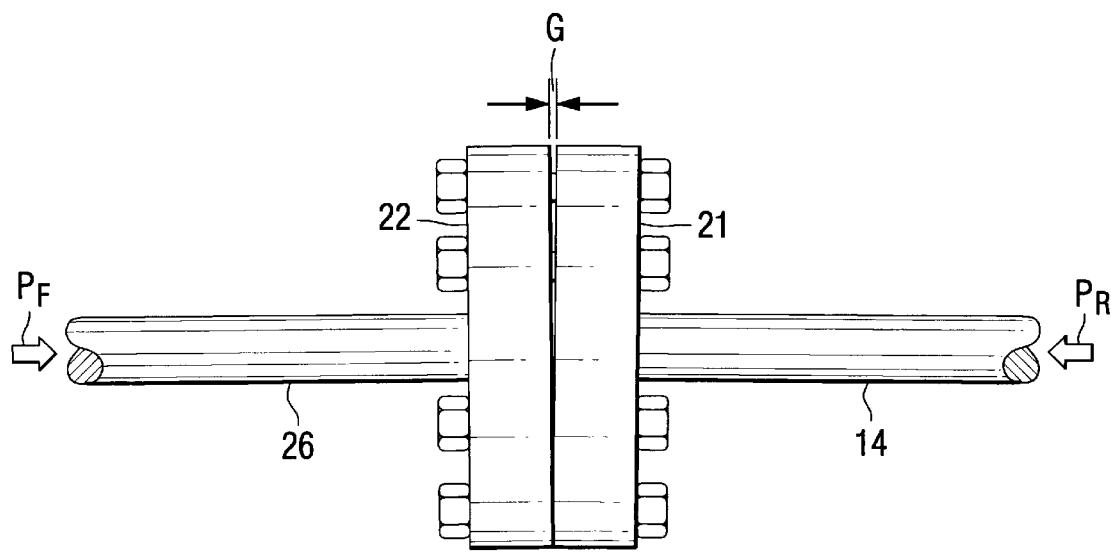
FIG. 3 shows a misalignment of the flanges attached to the two shafts shown in FIG. 2.

FIG. 3 illustrates a condition where the output shaft 14 and the propeller shaft 26 are not coaxially aligned. This creates a gap between the opposing faces of the first and second flanges, 21 and 22, as represented by dimension G in FIG. 3. It should be understood that rotation of the two shafts will typically cause the gap G to maintain its position relative to the hull of the boat, but moving in relation to each of the two flanges. This condition can create loud noises in the drive system and can result in severe damage to the components of the drive system if gap G is too large. For purposes of reference, a typical service manual for an inboard drive system specifies that the misalignment gap G be no more than 0.003 inches in magnitude.

In order to correct a misalignment gap such as that illustrated schematically in FIG. 3, the maintenance operator servicing a boat must first identify the position and magnitude of the gap G and then make alterations to the mounting system of the engine and transmission in order to move the position of the output shaft 14 relative to the propeller shaft 26 until gap G has been reduced to acceptable magnitudes around the total periphery of the joint between the first and second flanges, 21 and 22. This can be an extremely tedious and time consuming process. Unfortunately, this process should be performed after the initial 30 hours of operation of the boat and once again for every 100 hours of operation. In addition, when the boat is moved out of the water and back into the water, the process should be repeated. Additionally, it is recommended that the process be performed while the boat is in water in order to account for the effects of the water on the shape of the hull. It would therefore be significantly beneficial if a coupling could be developed which reduced the total amount of necessary maintenance and, in addition, which made the maintenance easier to perform.

Figure 4:
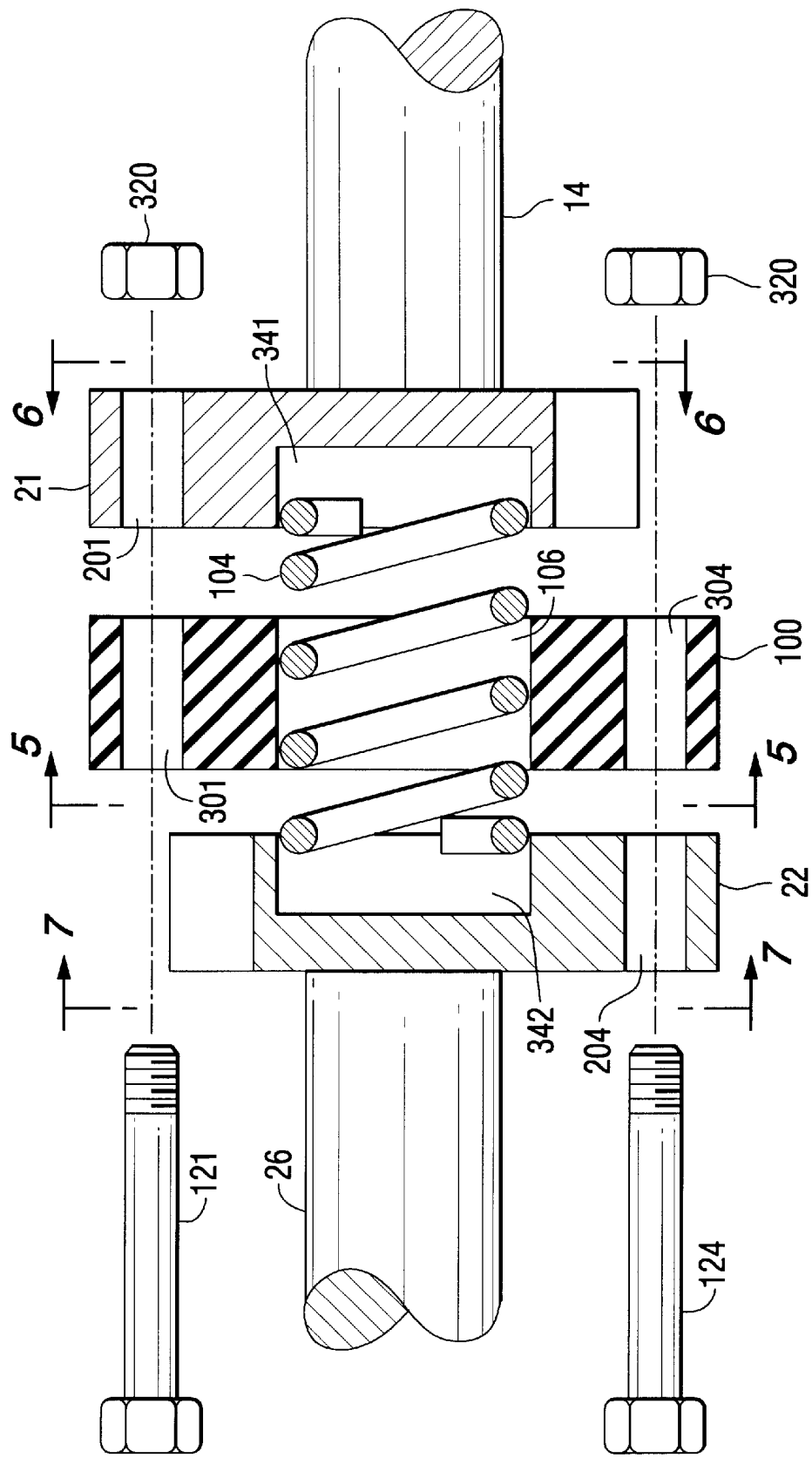
FIG. 4 is an exploded view of the present invention.

FIG. 4 is an exploded view of a coupling device made in accordance with the present invention. The present invention incorporates a first flange 21 attached to a first shaft 14 and a second flange 22 attached to a second shaft 26. A resilient annular member 100 is disposed between the first and second flanges, and a metal spring 104 is also disposed between the first and second flanges, 21 and 22. The first and second flanges are then fastened to either side of the resilient annular member 100 to compress the metal spring 104 therebetween.

In FIG. 4, two bolts, 121 and 124, are shown aligned various holes in the flanges and the resilient annular member. Bolt 121 extends through hole 201 in the first flange 21 and also through hole 301 in the resilient annular member 100. In comparison, bolt 124 passes through hole 204 in the second flange 22 and hole 304 in the resilient annular member 100. Other holes, which are not shown in FIG. 4, will be described below. After passing the bolts through their respective holes, nuts 320 are used to rigidly attach the bolts in place relative to their respective flanges and the resilient annular member. As shown in FIG. 4, the spring 104 is disposed through the central opening 106 of the resilient annular member 100. In a particularly preferred embodiment of the present invention, two pockets, 341 and 342, are formed in the opposing faces of the first and second flanges, 21 and 22, respectively. These pockets serve to locate the ends of the spring 104 and maintain the spring in a proper position when the first and second flanges are attached together through the intermediate resilient annular member.

FIG. 5 is a section view of FIG. 4 showing the resilient annular member 100 and its six holes, 301–306. The central opening 106 is also shown, but the spring 104 in FIG. 4 is not illustrated in FIG. 5 for purposes of simplicity and clarity.

FIG. 6 is a section view of FIG. 4 showing the first flange 21 with its three holes, 201, 203 and 205. By comparing FIGS. 4, 5 and 6, it can be seen that holes 201, 203 and 205 are associated with holes 301, 303 and 305 when the assembly is bolted together as indicated in FIG. 4.

FIG. 7 is a section view of the second flange 22 in FIG. 4. Holes 202, 204 and 206 of the second flange 22 are intended to be aligned with holes 302, 304 and 306 of the resilient annular member 100 shown in FIG. 5.

FIGS. 4, 5, 6 and 7 show that the arrangement of flanges in relation to the resilient annular member 100 align each of the three radial extensions of the first flange 21 with an interstitial space between the three radial extensions of the second flange 22. Similarly, each of the three radial extensions or points of the second flange 22 are aligned with interstitial spaces of the first flange 21. This can also be seen in FIG. 4 by noting that bolt 121 extends into an interstitial space of the second flange 22 which is diametrically opposite to hole 204. Similarly, bolt 122 extends into an interstitial space that is diametrically opposite on the first flange 21 from hole 201. As a result, the first and second flanges, 21 and 22, are not directly attached to each other. Rather, they are connected only through the resilient annular member 100.

Coupling devices that incorporate a resilient pad between two flanges are generally known to those skilled in the art. In addition, coupling devices that incorporate flanges with three points and three interstitial spaces are also generally known to those skilled in the art. In fact, flanges of this type are often used in conjunction with resilient pads to connect one shaft to another indirectly through the resilient pad.

It should be recognized that known coupling devices which incorporate a resilient pad between rigid flanges are typically not desirable for use in marine propulsion systems because of several reasons. Most importantly, the propulsion force $P_F$ described above in conjunction with FIGS. 1, 2 and 3 can be significantly high in many applications. If a misalignment, such as that illustrated in FIG. 3, exists in combination with a resilient pad between two rigid flanges, and an excessively high propulsion force $P_F$ is exerted by the propeller, the resilient pad could easily be destroyed or severely damaged.

Figure 8:
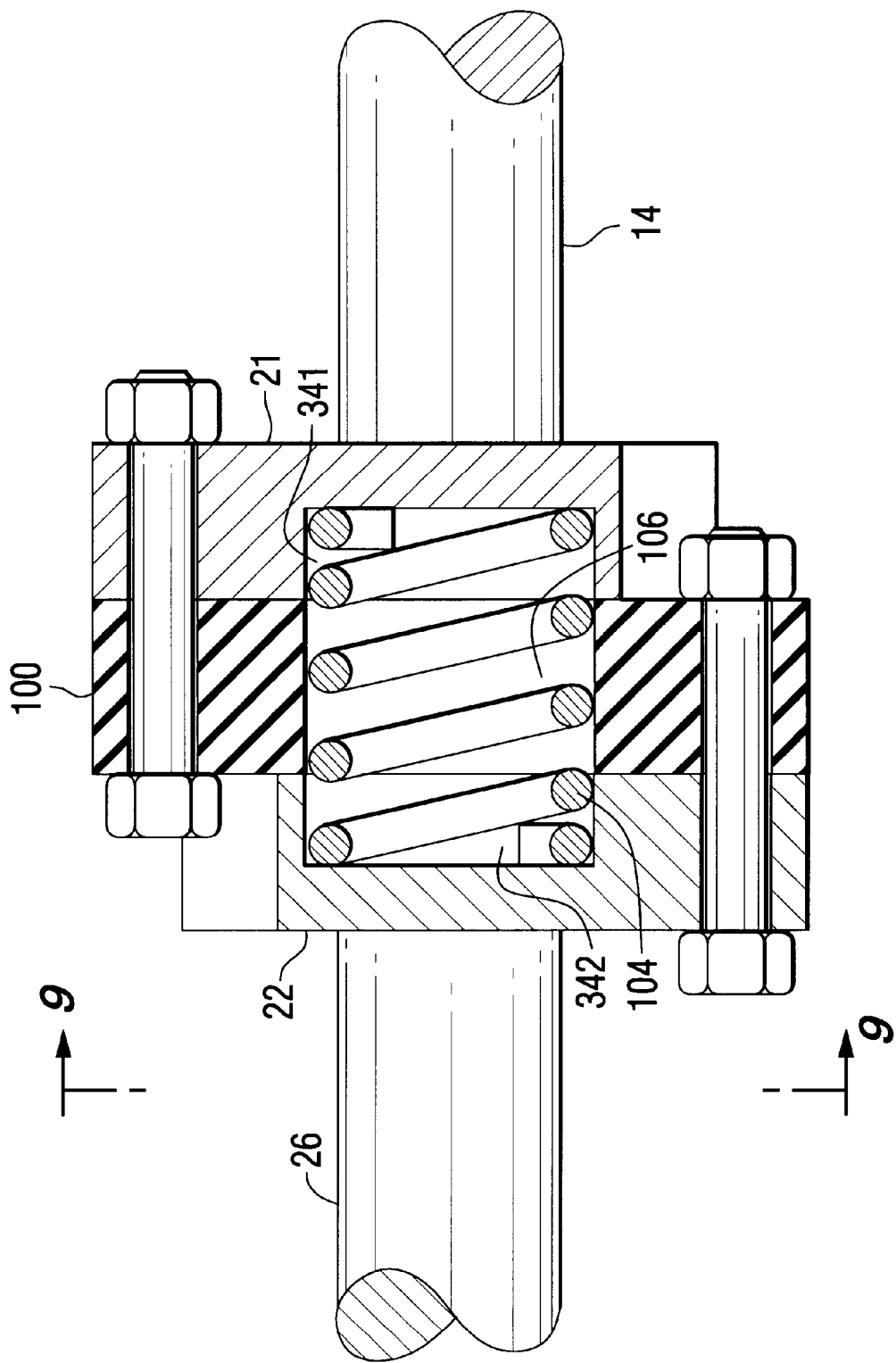
FIG. 8 is an assembled sectional view of the present invention.

In a coupling made in accordance with the present invention, the metal spring 104 is used to protect the resilient annular member 100 from this type of potential damage. As shown in FIG. 8, the spring 104 is disposed in the internal opening formed by the space 106 of the resilient annular member 100 and the two pockets, 341 and 342, formed in the opposing faces of the first and second flanges, 21 and 22, respectively. If a high propulsive force $P_F$ is exerted on the propeller shaft 26, the spring 104, which has a spring constant K of approximately 10,000 pounds/in or more in a preferred embodiment, withstands this force and protects the resilient annular member 100 from being overcompressed. If the spring 104 did not prevent this potential overcompression, the life of the resilient annular member 100 would be severely compromised and the coupling device would not is be practical for use in marine propulsion systems.

FIG. 8 shows the assembled coupling device with the spring 104 disposed in the internal opening formed by the central opening 106 of the resilient annular member 100 and the two pockets, 341 and 342, of the first and second flanges, 21 and 22.

Figure 9:
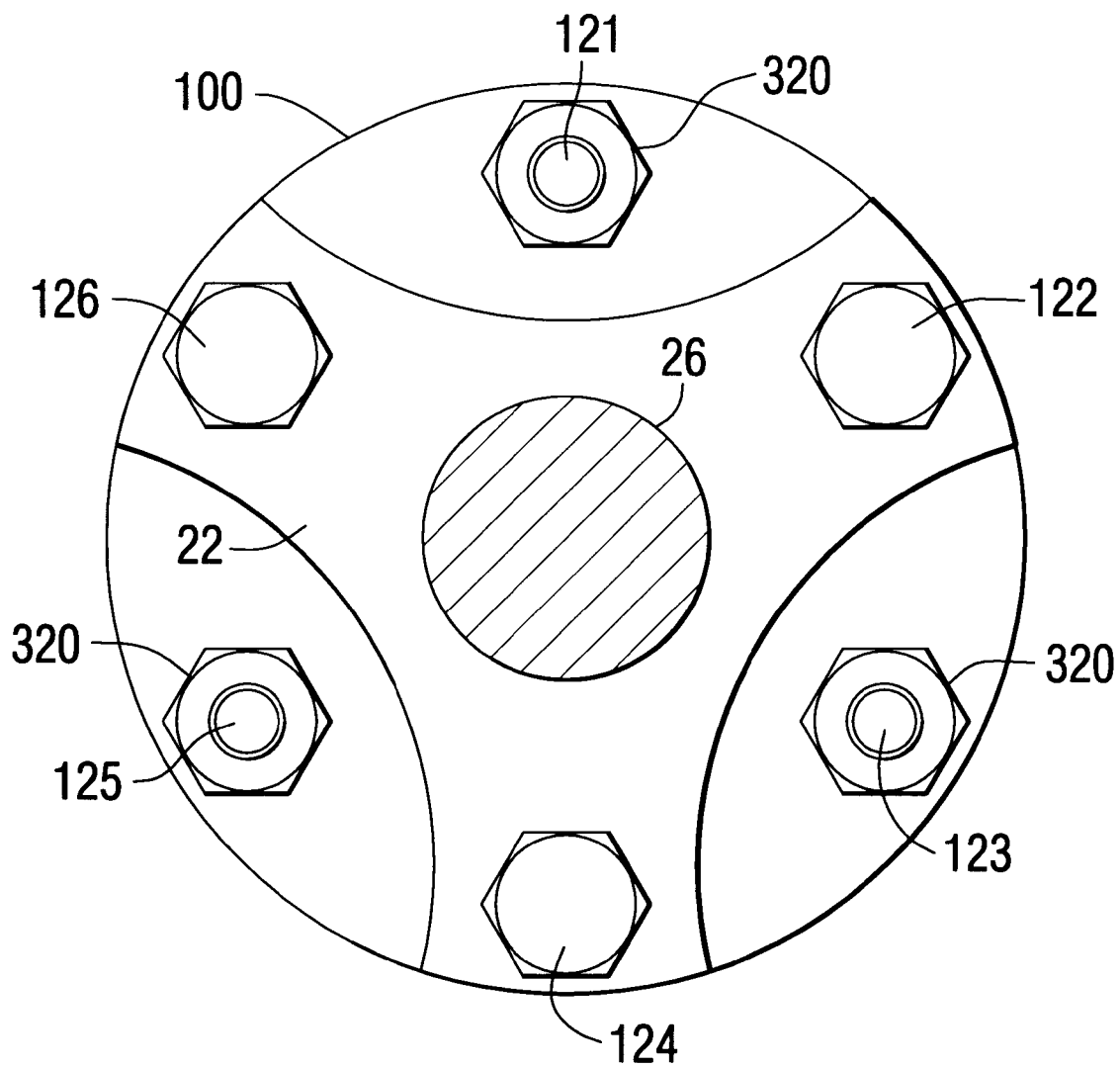
FIG. 9 is an end view of the device in FIG. 8.

FIG. 9 is an end view of FIG. 8 showing the second flange 22, the resilient annular member 100, and the three bolts, 122, 124 and 126, which extend through both the second flange 22 and the resilient annular member 100. It should be understood that the first flange 21, which is not seen in FIG. 9, is arranged so that its holes are aligned with the other three holes of the resilient annular member 100. These locations are identified by nuts 320 which are attached to the ends of bolts, 121, 123 and 125.

Figure 10:
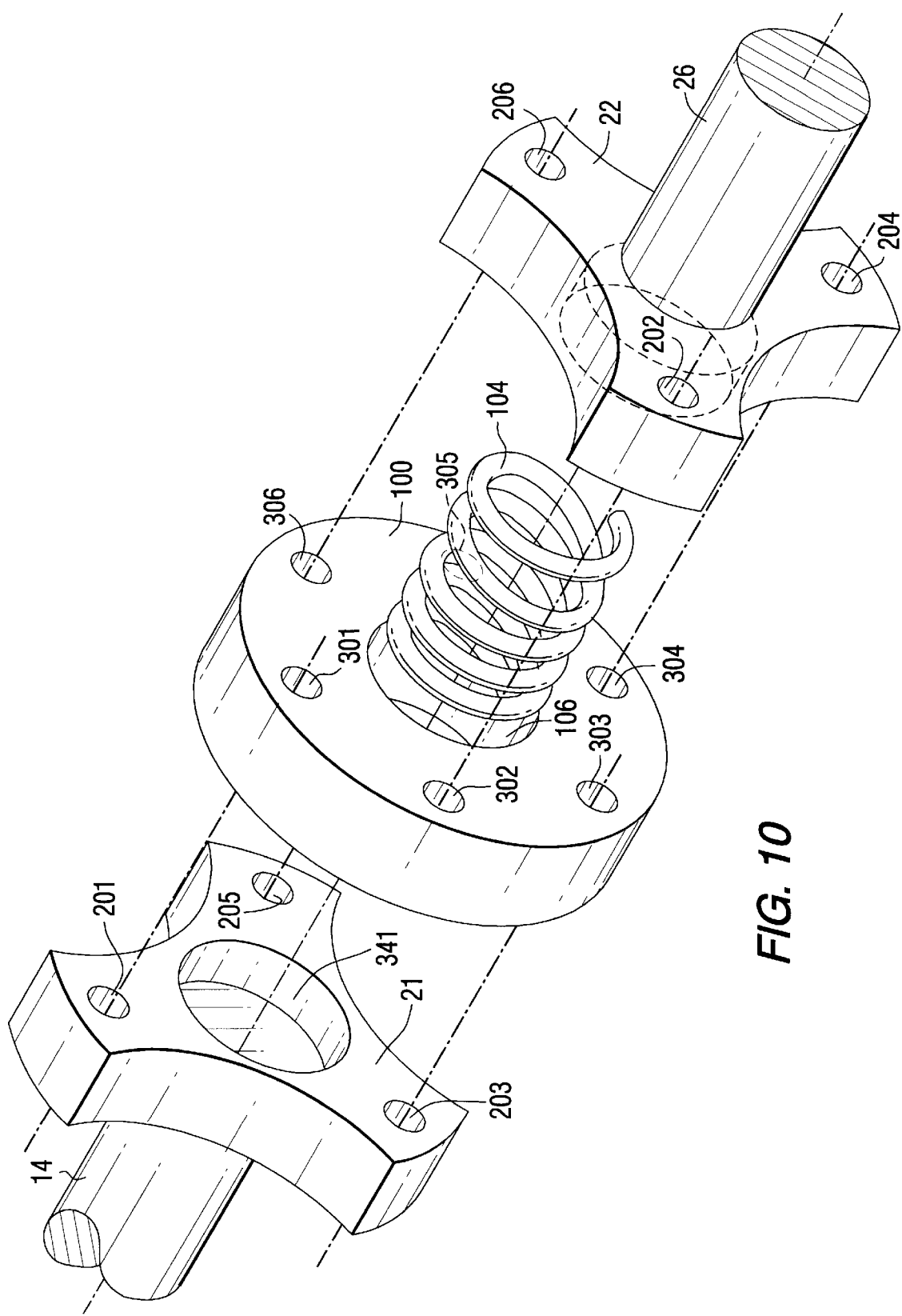
FIG. 10 is an exploded perspective view of the present invention.

FIG. 10 is an exploded perspective view of a coupling made in accordance with the principles of the present invention. The resilient annular member 100 is disposed axially between the first and second flanges, 21 and 22. The three holes in each of the two flanges are arranged to be aligned with alternate ones of the six holes in the resilient annular member 100. The spring 104 is disposed through the central opening 106 of the resilient annular member and, in particularly preferred embodiments of the present invention, is seated in pockets 341 and 342 which have been described above in conjunction with FIG. 4. When bolted together, the connection between the first and second flanges is accomplished only through the intermediate resilient annular member 100. The presence of the metallic spring 104 prevents the propulsive force $P_F$ exerted by the propeller from damaging the resilient annular member 100 between the two flanges, 21 and 22. The arrangement shown in FIG. 10 is not susceptible to damage because of slight misalignments, as in the situation presented by the prior art. Instead, the coupling of the present invention accommodates misalignment in a much more tolerant manner and provides a coupling which is quieter and less susceptible to damage when slight misalignments exist.

Although the present invention has been described with considerable detail and illustrated with particular specificity, alternative embodiments of the present invention are also within its scope.

We claim:

1. A coupler device, comprising:

a first flange attached to a first shaft;

a second flange attached to a second shaft, said first and second shafts being aligned generally in coaxial relation with each other;

a resilient annular member disposed between said first and second flanges; and a metal spring disposed between said first and second flanges, said first and second flanges being fastened together to compress said resilient annular member and said metal spring therebetween said metal spring providing an axial force resisting an axial compressive force on said resilient member by said first and second shafts.

2. The coupler device of claim 1, wherein:

said first shaft is an output shaft of a marine propulsion unit; and said second shaft is a propeller shaft.

3. The coupler device of claim 2, further comprising:

a boat, said second shaft extending through a hull of said boat.

4. The coupler device of claim 2, wherein:

said marine propulsion unit comprises an internal combustion engine and a transmission assembly.

5. The coupler of claim 1, wherein:

said first flange is generally triangular in shape with a first set of three holes formed therethrough.

6. The coupler of claim 5, wherein:

said second flange is generally triangular in shape with a second set of three holes formed therethrough.

7. The coupler of claim 6, wherein:

said resilient annular member has six holes formed therethrough, said first set of three holes being aligned and associated with a preselected three of said six holes to attach said first flange to said resilient annular member and the second set of three holes being aligned and associated with the remaining three of said six holes to attach said second flange to said resilient annular member.

8. The coupler of claim 1, wherein:

said resilient annular member is nonmetallic.

9. The coupler of claim 1, wherein:

said metallic spring is disposed through a central opening of said resilient annular member.

10. A coupler device, comprising:

a first flange attached to a first shaft;

a second flange attached to a second shaft, said first and second shafts being aligned generally in coaxial relation with each other;

a resilient annular member disposed between said first and second flanges; and a metal spring disposed between said first and second flanges, said first and second flanges being fastened together to compress said resilient annular member and said metal spring therebetween, said metal spring providing an axial force resisting an axial compressive force on said resilient member by said first and second shafts, said first flange is generally triangular in shape with a first set of three holes formed therethrough, said second flange is generally triangular in shape with a second set of three holes formed therethrough, said resilient annular member has six holes formed therethrough, said first set of three holes being aligned and associated with a preselected three of said six holes to attach said first flange to said resilient annular member and the second set of three holes being aligned and associated with the remaining three of said six holes to attach said second flange to said resilient annular member.

11. The coupler device of claim 10, wherein:

said first shaft is an output shaft of a marine propulsion device; and said second shaft is attached to a propeller.

12. The coupler of claim 11, wherein:

said marine propulsion device comprises an engine and a transmission.

13. The coupler device of claim 11, further comprising:

a boat, said second shaft extending through a hull of said boat.

14. The coupler of claim 13, wherein:

said resilient annular member is nonmetallic.

15. The coupler of claim 14, wherein:

said metallic spring is disposed through a central opening of said resilient annular member.

16. A coupler device, comprising:

a first flange attached to a first shaft;

a second flange attached to a second shaft, said first and second shafts being aligned generally in coaxial relation with each other;

a resilient annular member disposed between said first and second flanges; and a metal spring disposed between said first and second flanges, said first and second flanges being fastened together to compress said resilient annular member and said metal spring therebetween, said metal spring providing an axial force resisting an axial compressive force on said resilient member by said first and second shafts, said first flange is generally triangular in shape with a first set of three holes formed therethrough, said second flange is generally triangular in shape with a second set of three holes formed therethrough, said resilient annular member has six holes formed therethrough, said first set of three holes being aligned and associated with a preselected three of said six holes to attach said first flange to said resilient annular member and the second set of three holes being aligned and associated with the remaining three of said six holes to attach said second flange to said resilient annular member, said first shaft being an output shaft of an engine and transmission assembly, said second shaft being attached to a propeller.

17. The coupler device of claim 16, further comprising:

a boat, said second shaft extending through a hull of said boat.

18. The coupler of claim 17, wherein:

said resilient annular member is nonmetallic.

19. The coupler of claim 18, wherein:

said metallic spring is disposed through a central opening of said resilient annular member.

* * * * *